US009594237B2

(12) United States Patent
Schwedt et al.

(10) Patent No.: US 9,594,237 B2
(45) Date of Patent: Mar. 14, 2017

(54) METHOD FOR VARYING THE SCANNING FIELD OF A LASER SCANNING MICROSCOPE (71) Applicant: CARL ZEISS MICROSCOPY GMBH, Jena (DE)

(72) Inventors: Daniel Schwedt, Weimar (DE); Tiemo Anhut, Jena (DE); Tobias Kaufhold, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 96 days.

(21) Appl. No.: 14/348,564

(22) PCT Filed: Sep. 26, 2012

(86) PCT No.: PCT/EP2012/004020
§ 371 (c)(1),
(2) Date: Mar. 28, 2014

(87) PCT Pub. No.: WO2013/045078
PCT Pub. Date: Apr. 4, 2013

(65) Prior Publication Data
US 2014/0232848 A1   Aug. 21, 2014

(30) Foreign Application Priority Data

Sep. 29, 2011  (DE) .................. 10 2011 114 755
Sep. 21, 2012  (DE) .................. 10 2012 019 121

(51) Int. Cl.
*H04N 7/16*   (2011.01)
*G02B 21/00*   (2006.01)

(52) U.S. Cl.
CPC ......... *G02B 21/002* (2013.01); *G02B 21/008* (2013.01); *G02B 21/0024* (2013.01); *G02B 21/0036* (2013.01)

(58) Field of Classification Search
CPC ......... B82Y 35/00; B82Y 30/00; B82Y 10/00; B82Y 15/00; G02B 21/008; G02B 21/002;
(Continued)

(56) References Cited

U.S. PATENT DOCUMENTS 4,739,408 A * 4/1988 Gehrmann ............. H04N 5/228
                                                          348/326
6,028,306 A * 2/2000 Hayashi ............. G02B 21/0032
                                                          250/235
(Continued)

FOREIGN PATENT DOCUMENTS

JP   9-189864    7/1997
JP   9-281405    10/1997
(Continued)

OTHER PUBLICATIONS

WIPO Application No. PCT/EP2012/004020, International Search Report, mailed Nov. 15, 2012.
(Continued)

*Primary Examiner* — Gims Philippe
(74) *Attorney, Agent, or Firm* — Alston & Bird LLP (57) ABSTRACT

Disclosed is a method for varying the size of the scanning field of a multifocal laser scanning microscope, said scanning field being scanned in X columns and Y lines, and n laser spots being arranged at a distance d from one another in the scanning field along the slow scanning axis in the sample plane, the distance between the scanned lines in the sample plane being a=d/K, where K∈N, the size of the scanning field being varied by varying K. After scanning K lines, a vertical skip is made, e.g. a skip of (n−1)×K+1 lines in the scanning direction or (n+1)×K−1 lines against the scanning direction until at least Y lines have been scanned.

16 Claims, 9 Drawing Sheets

(58) Field of Classification Search
CPC ............ G02B 21/0032; G02B 21/0064; G02B 21/0076; G02B 21/0036; G02B 21/244
USPC .................................................... 348/80, 98
See application file for complete search history.

(56) References Cited

U.S. PATENT DOCUMENTS

| | | | |
|---|---|---|---|
| 2007/0127003 A1* | 6/2007 | Aikawa ................ | G02B 21/002 355/53 |
| 2008/0187208 A1 | 8/2008 | Shirota | |
| 2011/0036981 A1* | 2/2011 | Zhao .................. | G01N 23/2206 250/307 |

FOREIGN PATENT DOCUMENTS

| | | |
|---|---|---|
| JP | 10-311950 | 11/1998 |
| JP | 2005-164815 | 6/2005 |
| JP | 2007-156231 | 6/2007 |
| JP | 2008-191427 | 8/2008 |

OTHER PUBLICATIONS

WIPO Application No. PCT/EP2012/004020, Written Opinion, mailed Nov. 15, 2012.
Japanese Application No. 2014-532272, Office Action mailed Sep. 13, 2016.

* cited by examiner

| Number of cells between adjacent individual spots | Number of scanning intervals | relative field size in % |
|---|---|---|
| 1 | 128.00 | 12800.0 |
| 5 | 25.60 | 2560.0 |
| 10 | 12.80 | 1280.0 |
| 20 | 6.40 | 640.0 |
| 30 | 4.27 | 426.7 |
| 40 | 3.20 | 320.0 |
| 50 | 2.56 | 256.0 |
| 60 | 2.13 | 213.3 |
| 70 | 1.83 | 182.9 |
| 80 | 1.60 | 160.0 |
| 90 | 1.42 | 142.2 |
| 100 | 1.28 | 128.0 |
| 101 | 1.27 | 126.7 |
| 102 | 1.25 | 125.5 |
| 103 | 1.24 | 124.3 |
| 104 | 1.23 | 123.1 |
| 105 | 1.22 | 121.9 |
| 106 | 1.21 | 120.8 |
| 107 | 1.20 | 119.6 |
| 108 | 1.19 | 118.5 |
| 109 | 1.17 | 117.4 |
| 110 | 1.16 | 116.4 |
| 115 | 1.11 | 111.3 |
| 116 | 1.10 | 110.3 |
| 117 | 1.09 | 109.4 |
| 118 | 1.08 | 108.5 |
| 119 | 1.08 | 107.6 |
| 120 | 1.07 | 106.7 |

Fig. 5a

| | | |
|---|---|---|
| 121 | 1.06 | 105.8 |
| 122 | 1.05 | 104.9 |
| 123 | 1.04 | 104.1 |
| 124 | 1.03 | 103.2 |
| 125 | 1.02 | 102.4 |
| 126 | 1.02 | 101.6 |
| 127 | 1.01 | 100.8 |
| 128 | 1.00 | 100.0 |
| 129 | 0.99 | 99.2 |
| 130 | 0.98 | 98.5 |
| 140 | 0.91 | 91.4 |
| 150 | 0.85 | 85.3 |
| 200 | 0.64 | 64.0 |
| 256 | 0.50 | 50.0 |
| 300 | 0.43 | 42.7 |
| 384 | 0.33 | 33.3 |
| 400 | 0.32 | 32.0 |
| 500 | 0.26 | 25.6 |
| 512 | 0.25 | 25.0 |

Fig.7

METHOD FOR VARYING THE SCANNING FIELD OF A LASER SCANNING MICROSCOPE

CROSS-REFERENCE TO RELATED APPLICATIONS

This is a national stage application filed under 35 U.S.C. §371 based on International Patent Application No. PCT/EP2012/004020, filed Sep. 26, 2012, and published as WO 2013/045078 on Apr. 4, 2013. This application also claims priority under 35 U.S.C. §119 to German Patent Application No. DE 10 2011 114 755.5, filed Sep. 29, 2011, and to German Patent Application No. DE 10 2012 019 121.9, filed Sep. 21, 2012. The entire contents of all of the above-identified patent applications are expressly incorporated herein by reference.

PRIOR ART

In conventional laser scanning microscopes (LSM) a two-dimensional image of the sample is recorded by guiding a beam of light point by point over the sample. The deflection of the beam usually takes place by means of movable scanning mirrors. In this connection reference is made by way of example to J. Pawley, "Handbook of biological confocal microscopy".

The number of pixels of the image can be set depending upon the required image size, resolution and scanning. A frequently used image format is for example 512×512 pixels.

The size of the scanned sample region can be changed without changing the number of pixels by changing the maximum scanning angle of the scanner mirrors. This change of the imaging scale is possible in a practically gradual manner and is designated as zoom.

In LSMs with multi-spot excitation the sample is scanned simultaneously with a plurality of beams. In this way a sample can be scanned more quickly by comparison with recording with single-point excitation.

Figure 6:
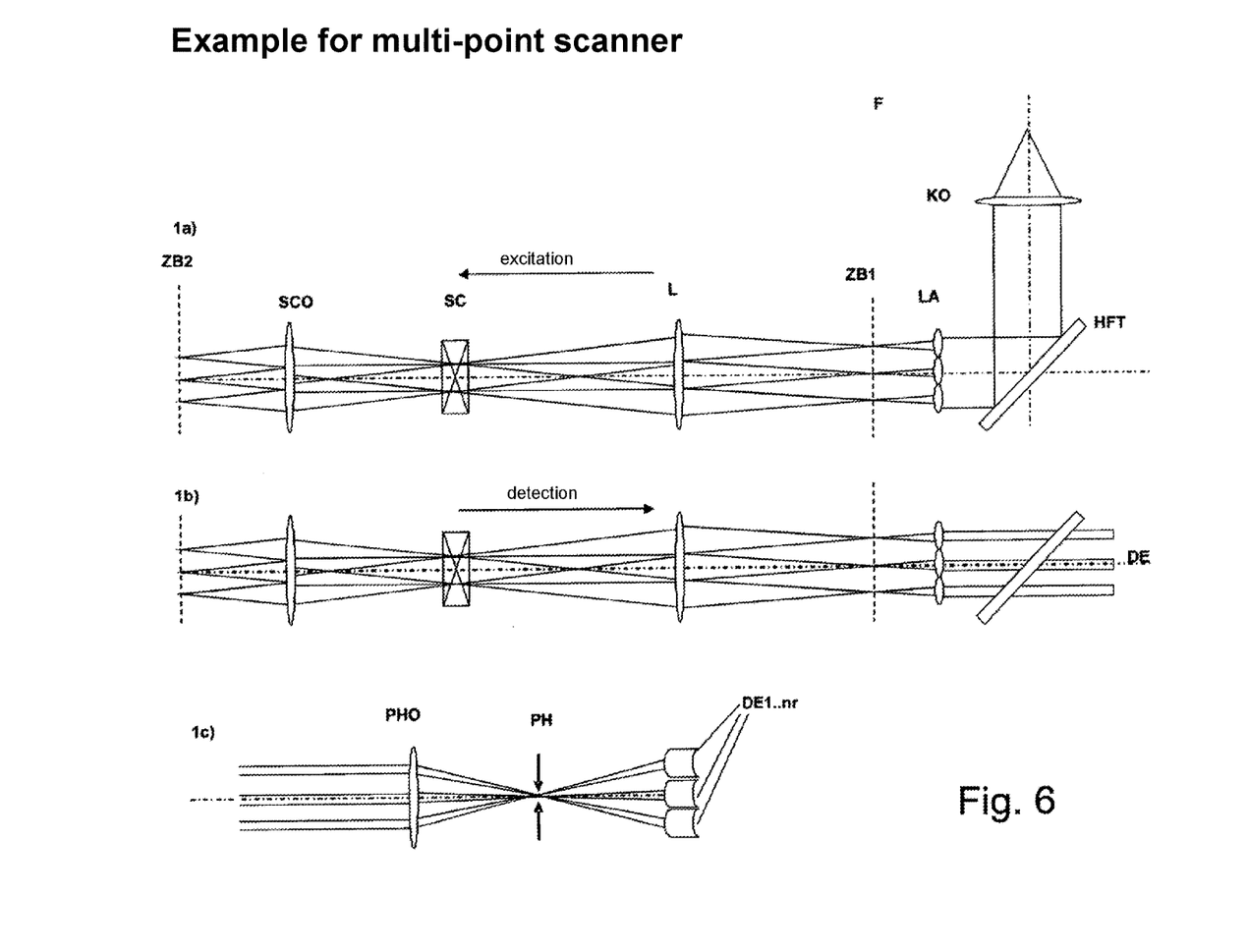
FIG. 6 illustrates an exemplary embodiment of a multi-point scanner in accordance with one or more embodiments of the invention.

An arrangement for multi-spot irradiation is illustrated by way of example in FIG. 6.

The following reference signs are used with the following meanings:
F: fibre
KO: fibre collimator lens
Hft.: main colour splitter of the microscope
LA 1 . . . n>: lens array composed of n individual lenses
L: multi-spot lens
SC: scanner
SCO: scanning objective
ZB: intermediate image
O: microscope objective
DE: detection beam path
PHO: pinhole objective
PH: individual pinhole
ZB1, ZB2: intermediate image planes
DE1 . . . n: detector array composed of n individual detectors
PHA: pinhole array
MLAPH: pinhole microlens array In the part 6a) the direction of illumination is shown in the direction of the sample, in the part 6b) the direction of detection of the detected sample light is shown and in the part 6c) the beam path before the detector is shown.

The illuminating light exits divergently from a fibre F and passes, collimated via a collimator KO and reflected by the main colour splitter HFT of the microscope in the direction of the sample, to a lens array LA.

The illumination spots generated in an intermediate image ZB1 by the LA are collimated via the multi-spot lens L and refracted towards the optical axis and meet in the case of telecentric illumination in the rear focal point of L in which the scanner SC is disposed.

The foci generated in the intermediate image ZB2 after the scanning objective SCO are imaged further by means of the microscope objective O (not shown) onto the sample, so that the illumination points on the sample are moved by the at least one-dimensional scanner.

The light coming from the sample arrives via the same elements in direction of detection DE via a pinhole objective and a pinhole at individual detectors DE1 . . . n.

The individual beams collimated after the passage through LA are focused by the pinhole objective in the plane of a pinhole, and thus only one single pinhole is necessary.

Detectors DE1 . . . n corresponding to the individual illuminated sample points for detection of the fluorescence distribution generated on the sample lie in the double focal length of the PHO.

Instead of the individual pinholes PH, in the detection the light can be focused by an array of individual lenses (not shown here) onto a pinhole array, a detector array DE1 . . . n being disposed downstream thereof.

The illumination and detection beam paths on the HFT can also be interchanged, so that the illuminating light is transmitted through the HFT in the direction of the sample and the HFT reflects the sample light in direction of detection.

Figure 1:
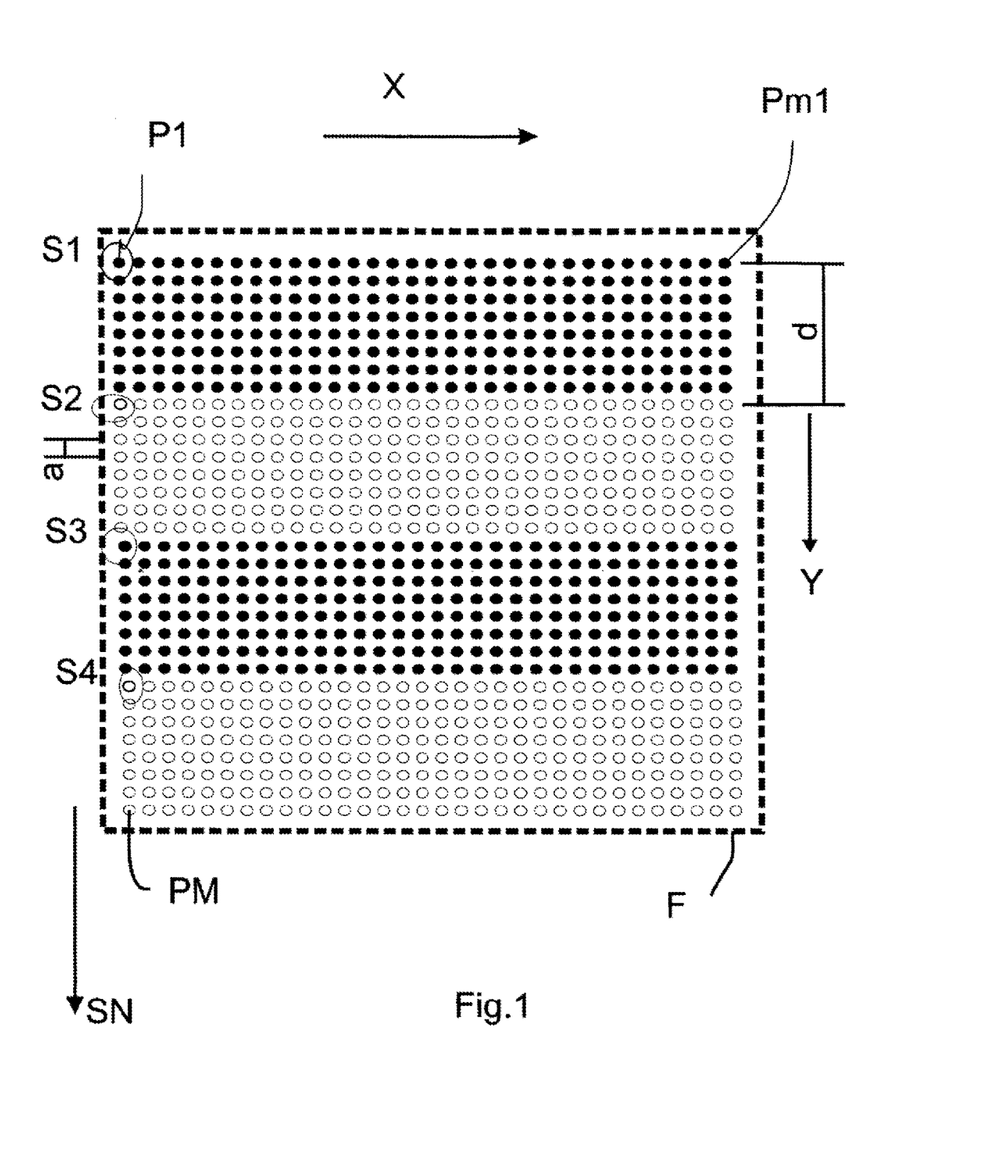
FIG. 1 illustrates an exemplary embodiment of a scanning field in accordance with one or more embodiments of the invention.

As a rule the spots are disposed so that each spot scans a part-region of the image, wherein the spacing of the spots in the sample plane is fixed. In FIG. 1 by way of example a field of 32×32 pixels is shown which has been scanned by 4 spots. Each spot scans a quarter of the image field and the 4 part-images are assembled into an overall image. In the case of a predetermined number of lines of the picture the geometric spacing of the lines in the sample plane results from the condition that the part-images of adjacent spots must directly adjoin one another after completion of the scanning operation. The field in which each spot travels over an equal-sized part-field, so that the entire field is composed of N part-fields (in the case of N spots), is designated as the field with maximum enlargement.

If an attempt is now made in a conventional manner to zoom by changing the maximum scanning angle, the field size changes in the direction of the fast scanning axis, but the spacing of the spots remains unchanged, so that a uniform scanning of the field, wherein the part-images of all spots are the same size and abut one another, is only possible at specific field sizes. A zoom is particularly problematic if the number of pixels of the image (for example 512×512 pixels) is predetermined U.S. Pat. No. 7,385,165 B2 describes a technique which enables zooming only in a few very large stages.

Fields are scanned, the size of these fields being an integral multiple of the field size in the case of maximum enlargement, wherein moreover the integral multiple can be represented as the power $L^K$ of two natural numbers, with $L>1$. If the scanned field is enlarged by $L^K$ times, the number of lines per spot and part-image is likewise reduced by $L^K$ times. This severely restricts the number of zoom stages which can be selected. With the boundary conditions that the spots cannot fall short of a minimum spacing, so that there is no crosstalk on the detector between the fluorescence signals which they generate and that each microscope can only transmit one maximum field, the result for L=2 is precisely 5 available zoom stages with the factors 1, 2, 4, 8, 16 with respect to the maximum enlargement. In the case of L>2 the limitation of the method described in U.S. Pat. No. 738,565 B2 is more obvious. Moreover, according to this method starting from the so-called "maximum enlargement" only a switch to smaller enlargements is possible.

In U.S. Pat. No. 6,028,306 a light array is moved in small regions around the scan spots of a light array. This renders difficult a zoom function which is to be performed by means of the scanner.

OBJECT OF THE INVENTION

The present invention should make it possible to graduate the possible zoom stages more finely with a predetermined pixel resolution. With typical pixel rasters (for example 512×512 pixel) almost constant zooming should be possible.

Moreover the object of the present invention is to enable zooming both to larger and also to smaller fields.

SOLUTION ACCORDING TO THE INVENTION

The following terms are defined in greater detail below in order to facilitate unambiguous use:

Spots or light spots S1-SN: illumination points on the sample which are generated simultaneously by N focused laser beams or a laser beam divided into N parts.

Spot spacing d: spacing between the adjacent illumination spots on the sample.

Pixels or image pixels: P1-M, P1-M1: detection values assigned by the detection unit to an image point.

They are recorded like a raster, i.e. a clocked detection takes place with continuous scanning movement, so that in the form of a raster values are detected which correspond to a point-like sample region.

The pixel spacing: is generally the spacing between the centres of two detected pixels.

The scanning field F corresponds to an image of a sample to be recorded which is optically covered by the scanner movement.

The extent of the scanning field or image field is limited by the microscope optics used.

Raster area: is a part-area of the scanning field which is scanned by one of the illumination spots, wherein the scanned image points can be detected and stored.

The described solution describes a method which in the case of a multi-spot LSM makes it possible with predetermined scanning field sizes to facilitate a finely graduated zoom function.

The invention is described in detail below with reference to the schematic illustrations.

The solution according to the invention is achieved with a multi-spot LSM with N spots, S1 to SN. The spots lie for example in the Y direction and preferably have the same spacing d from one another. The fast scan over the sample takes place for example in the X direction.

A scanning field F such as in FIG. 1 is predetermined, which should contain a predetermined number of pixels, for example 32×32=1024 in FIG. 1.

If now the spot spacing d predetermined (by the microscope) on the sample is divided into k (integral) equal parts, and the scan takes place in the X and Y direction in this raster, that is to say in steps 1 to k, then after k lines in the Y direction a region up to a point PM in the Y direction of M=N×k lines is scanned. If also in the X direction M1 points are scanned up to a point Pm1, this results in a scanned region of M×m1 pixels. Each individual spot has scanned a region of m1×K pixels and the combination of the N individual images produces the entire field of M×m1 pixels.

Figure 3:
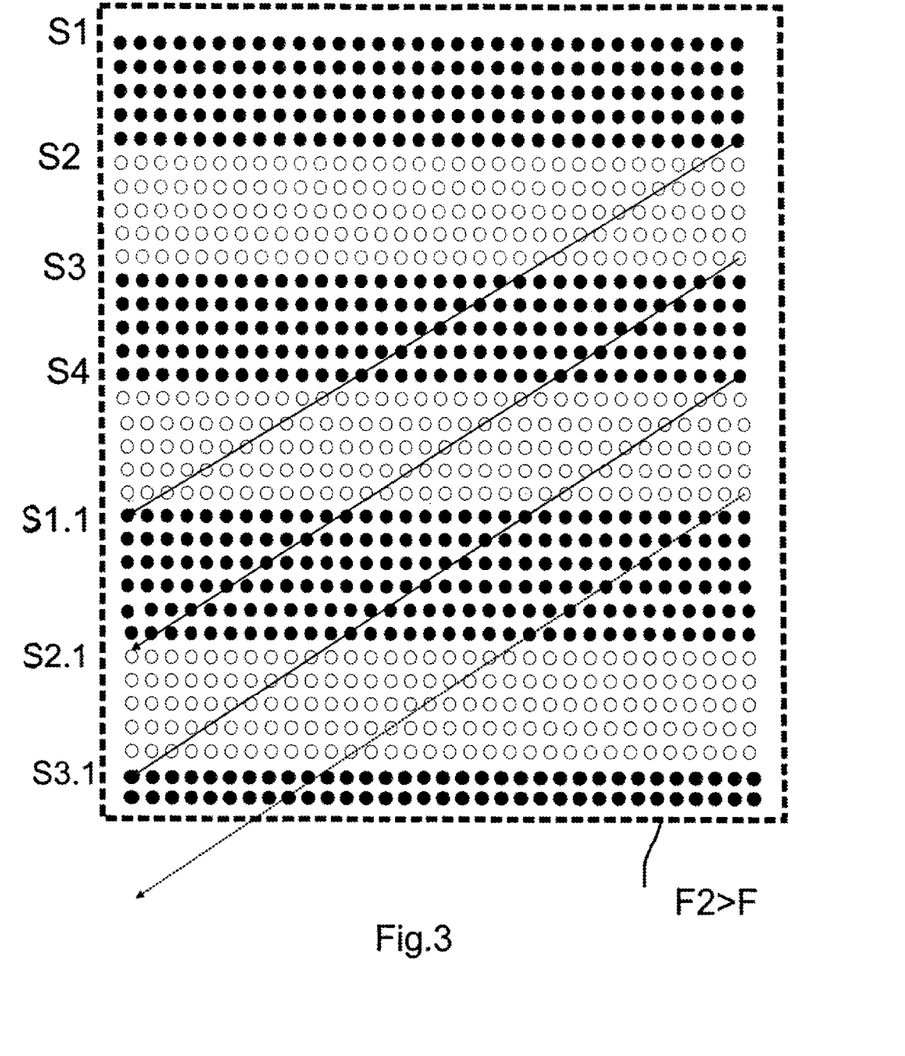
FIG. 3 illustrates an exemplary embodiment of a scanning field in accordance with one or more embodiments of the invention.

If the scanned field F2 should now be enlarged with the same number of pixels M×m1 as in FIG. 3, then this can take place by division of the spot spacing (whole number) into L parts, wherein now L<K and L>=1.

After L lines a region of N (number of spots)×L (division of spot spacing) lines is scanned.

Up to the line M (K−L)×N lines are then still lacking.

These lines are advantageously scanned by continuing the line scan offset by L×(N−1)+1 lines (FIG. 3). This procedure is repeated until all M lines have been scanned. In this case it may be that in the last region all spots are no longer required. This can be corrected by switching off in the illumination or on the detection side with the aid of the detected point raster.

As a result of this procedure an image is produced again with M×m1 pixels, but this is advantageously greater by the factor K/L.

Figure 2:
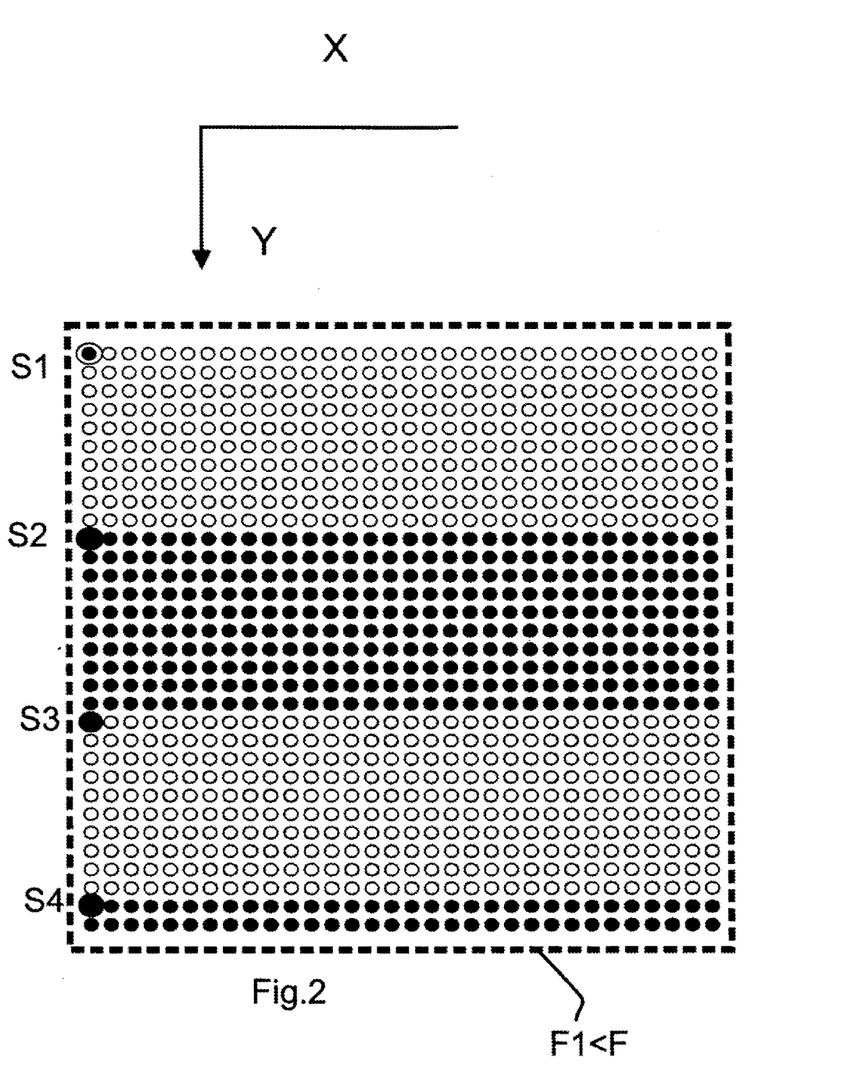
FIG. 2 illustrates an exemplary embodiment of a scanning field in accordance with one or more embodiments of the invention.

Likewise with the same number of pixels M×m1 the scanned field can be reduced in size, by dividing the spot spacing into P (whole number) parts, wherein P>K. (FIG. 2). After P lines a region would already be scanned which is greater by (P−K)×N lines than the desired region of M lines. Therefore as mentioned above not all the data of all spots are used for the image representation.

As a result of this procedure an image is produced again with M×m1 pixels, which is smaller by the factor P/K.

When n laser spots are disposed in the scanning field along the slow scanning axis in the sample plane in each case with a spacing d relative to one another, and the spacing of the scanned lines in the sample plane is a=d/K with K∈N, the variation in the size of the scanning field advantageously takes place by variation of K, and after the scanning of K lines according to the invention a vertical skip takes place in such a way that the scanned part-images adjoin one another, preferably through a skip by (n−1)×K+1 lines in the scanning direction or (n+1)×K−1 lines against the scanning direction, until at least Y lines have been scanned.

The solution according to the invention should also be explained using an example:

FIG. 1 shows a scanning field F of 32×32 pixels which has been scanned here with 4 spots S1-S4. The pixels of each spot have been shown for the sake of clarity as circles which are filled differently from one another (dark and light).

Figure 4:
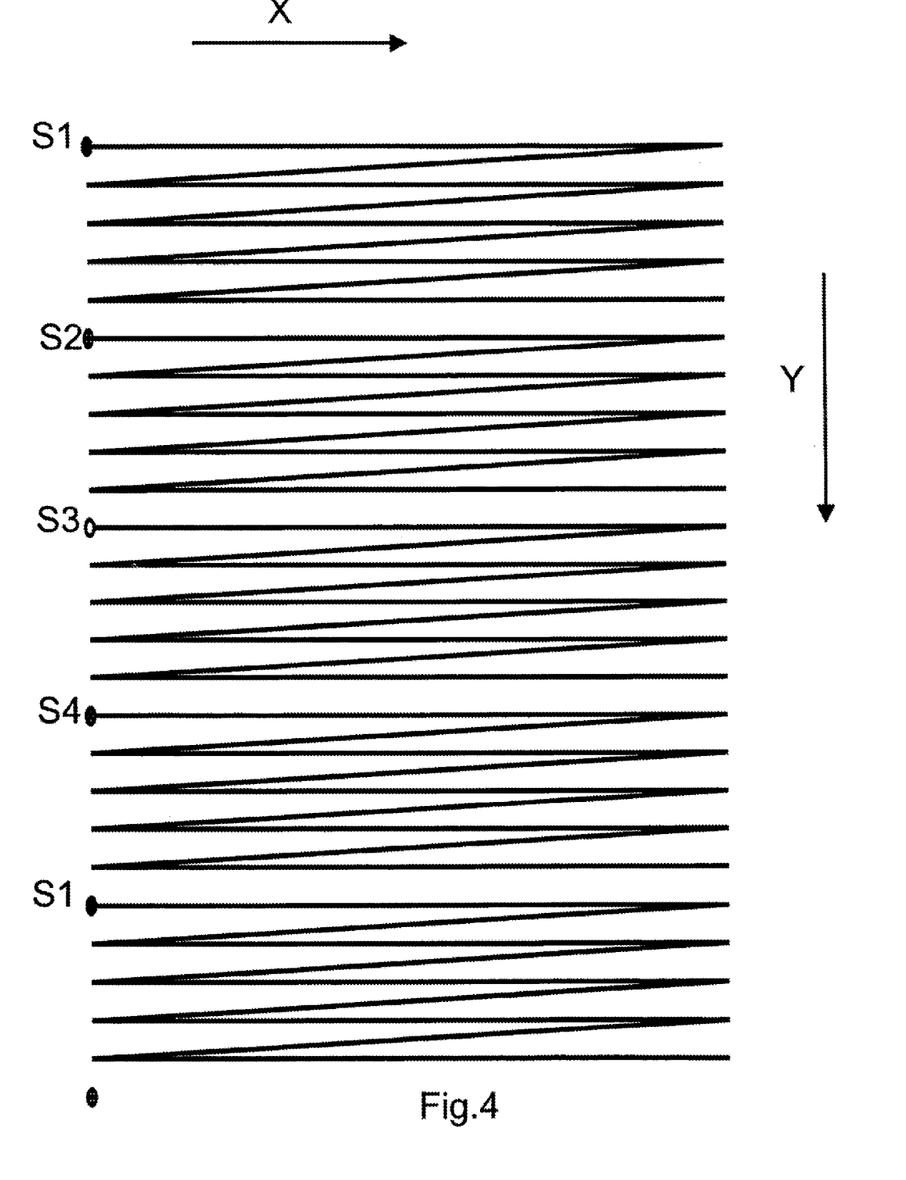
FIG. 4 illustrates an exemplary embodiment of a data table in accordance with one or more embodiments of the invention.

The scanning movement between the starting points P1-PM of the horizontal scanning movement is shown schematically in FIG. 4 by movement lines. The scan takes place in FIG. 1 for example so that the spacing between two adjacent pixels is one eighth of the spot spacing. Thus after 8 line scan the entire image field is scanned. Each spot has scanned a field of 8×32 pixels and the entire field is composed of the 4 raster areas, so that a recording of the image field F with a resolution of 1024 pixels takes place.

Figure 1A:
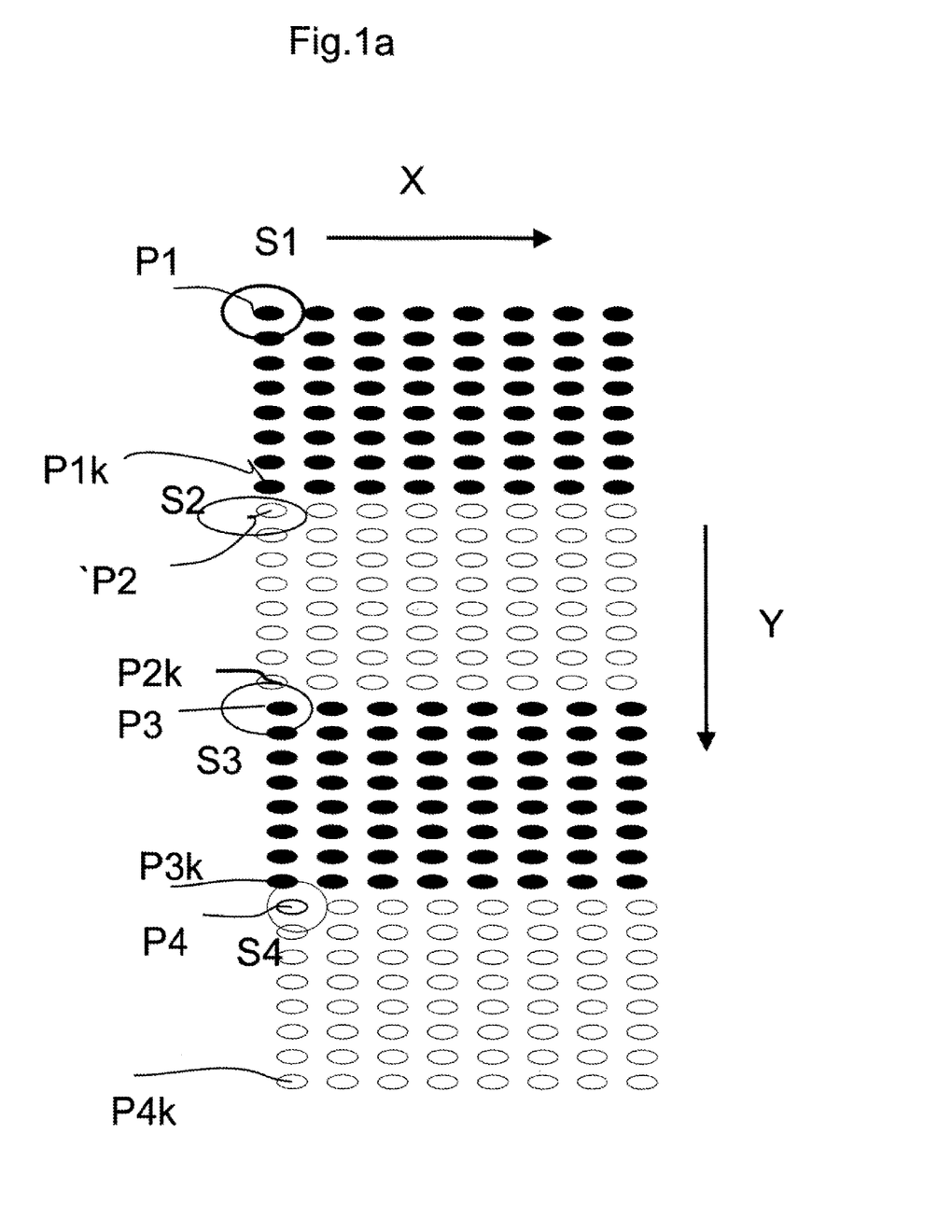
FIG. 1a illustrates an exemplary embodiment of a scanning field in accordance with one or more embodiments of the invention.

In FIG. 1a the left-hand part of FIG. 1 is shown as an enlarged detail.

The respective starting points of the spot S1 in Y with the X line shifted in the vertical direction are P1-Pk, at a spacing d/k relative to one another.

Analogously the spots S2-S4 have the starting points P2-P2k, P3-P3k, P4-P4k in each case at the spacing d/k relative to one another.

FIG. 3 illustrates how a field F2 which is larger relative to F in FIG. 1 can likewise be scanned with 32×32 pixels. In this case the pixel spacing is for example one fifth of the spot spacing. Thus after 5 line scans from S1-S4 20 lines are scanned. Now for S1-S3 a skip must take place in the Y direction by 15 pixels into the starting positions of the lines S1.1, S2.1, S 3.1. Then the rest of the lines are scanned. For this purpose 5 line scans are again necessary, wherein the data of all individual spots are not required for representation of the field. Of the first and second spots all lines are required, of the third spot only the first both lines are required and the data of the last spot are not required at all. Again the combination of the individual fields results in the entire field. The field is 1.6 times larger than that illustrated in FIG. 1.

In this case it is advantageous if the individual spots can be switched off individually. In this way it is possible to avoid an unnecessary irradiation of these object areas.

FIG. 2 illustrates how according to the invention a field F1 which is smaller relative to F can also be scanned with 32×32 pixels. In this case the pixel spacing is for example one tenth of the spot spacing. After 10 line scans 40 lines are scanned, that is to say already 8 more than required. The part-regions are combined into an overall region, wherein only the first two lines of the fourth individual spot are required. From the third line the fourth individual spot can be switched off. The field size achieved is smaller by the factor 0.8 than the field in FIG. 1.

Depending upon the field size and the number of spots a graduation of the field sizes and thus of the enlargement with differing fineness can advantageously be achieved in the described manner.

Figure 5:
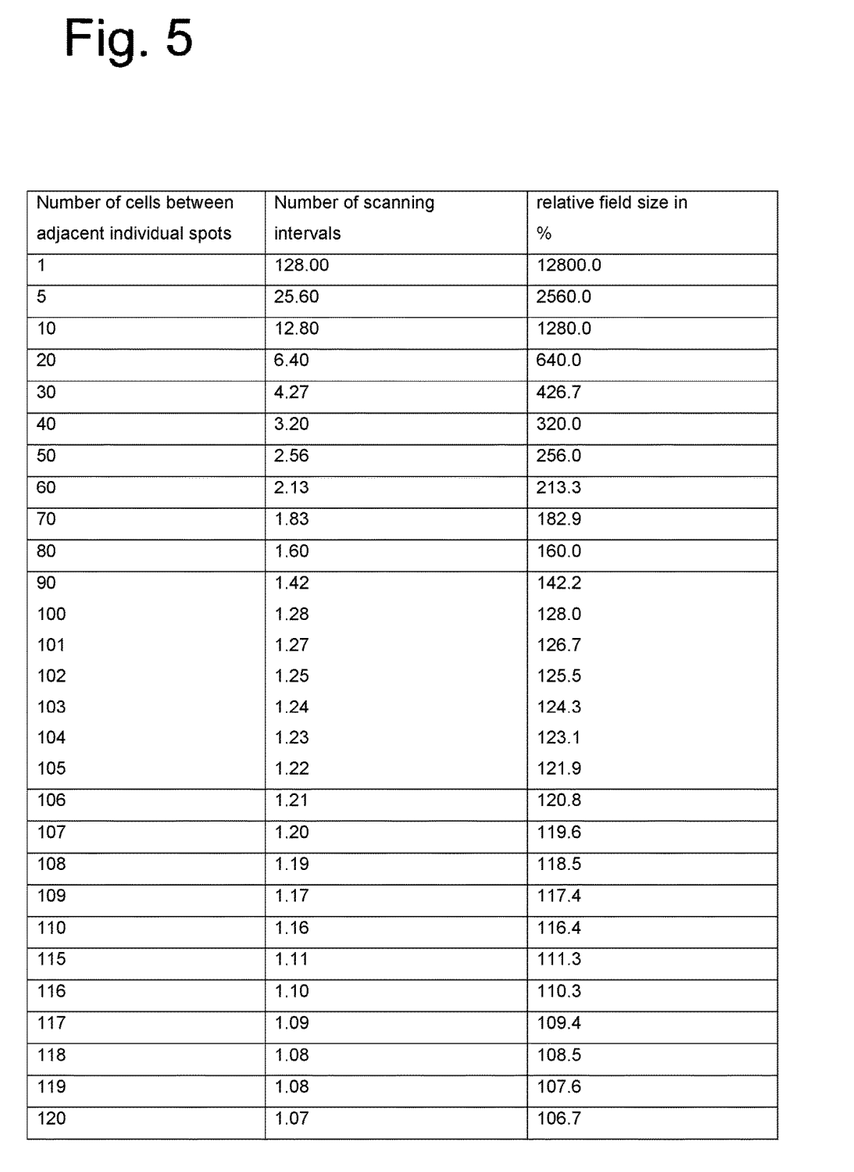
FIG. 5 illustrates an exemplary embodiment of a data table in accordance with one or more embodiments of the invention.
Figure 5A:
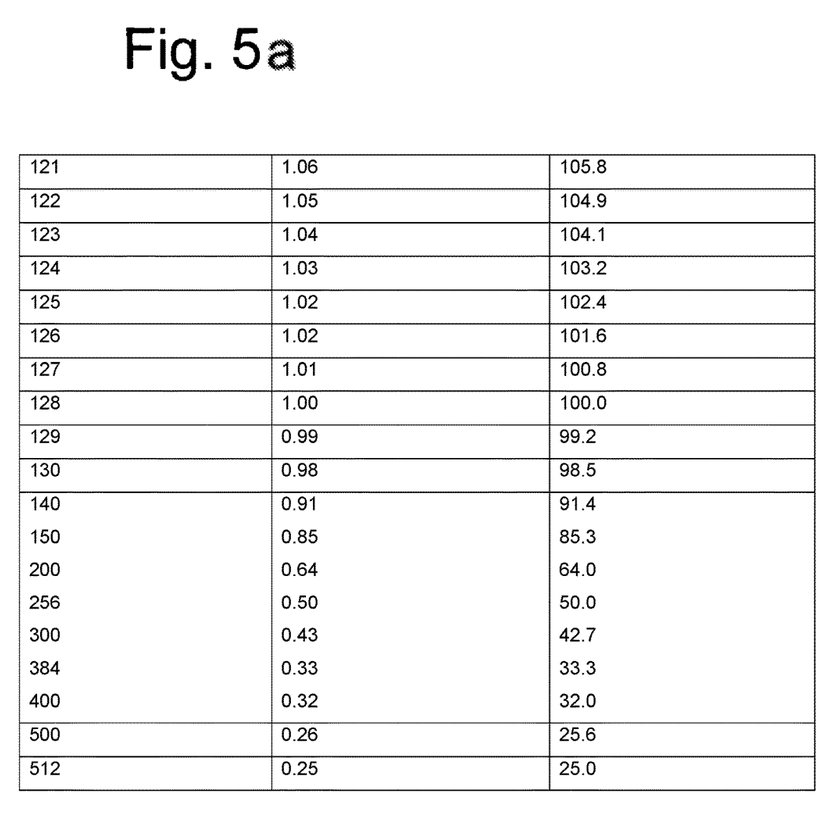
FIG. 5a illustrates an exemplary embodiment of a scanning field in accordance with one or more embodiments of the invention.

In the table in FIG. 5 the graduation of the field sizes is illustrated using the example of 512×512 pixels and 4 individual spots.

If the pixel spacing is chosen as 1/128 of the spot spacing, then the entire field is scanned after 128 line scans. Each individual spot has scanned a part-region of 128×512 pixels. All other field sizes have been related to this field size. Thus it amounts to 100%. The scan of the entire field could take place through a completed scan of all 4 individual spots.

The table shows for several possible line spacings how many scan regions are necessary in order to scan the entire field with 512×512 pixels. In the third line it is shown how the field size changes relatively.

In the region of very smaller fields the scan takes place only with 3 or 2 individual spots. From 512 line regions only one individual spot scan takes place.

In the conventional zoom range there is an almost smooth division of the enlargement stages, that is to say a practically continuous zoom.

In order to increase the flexibility this can advantageously also be supplemented by variation of an optical zoom in the illuminating beam path of the LSM or by (adjustable or interchangeably configured) changes to the spot spacings of the illumination raster.

Figure 7:
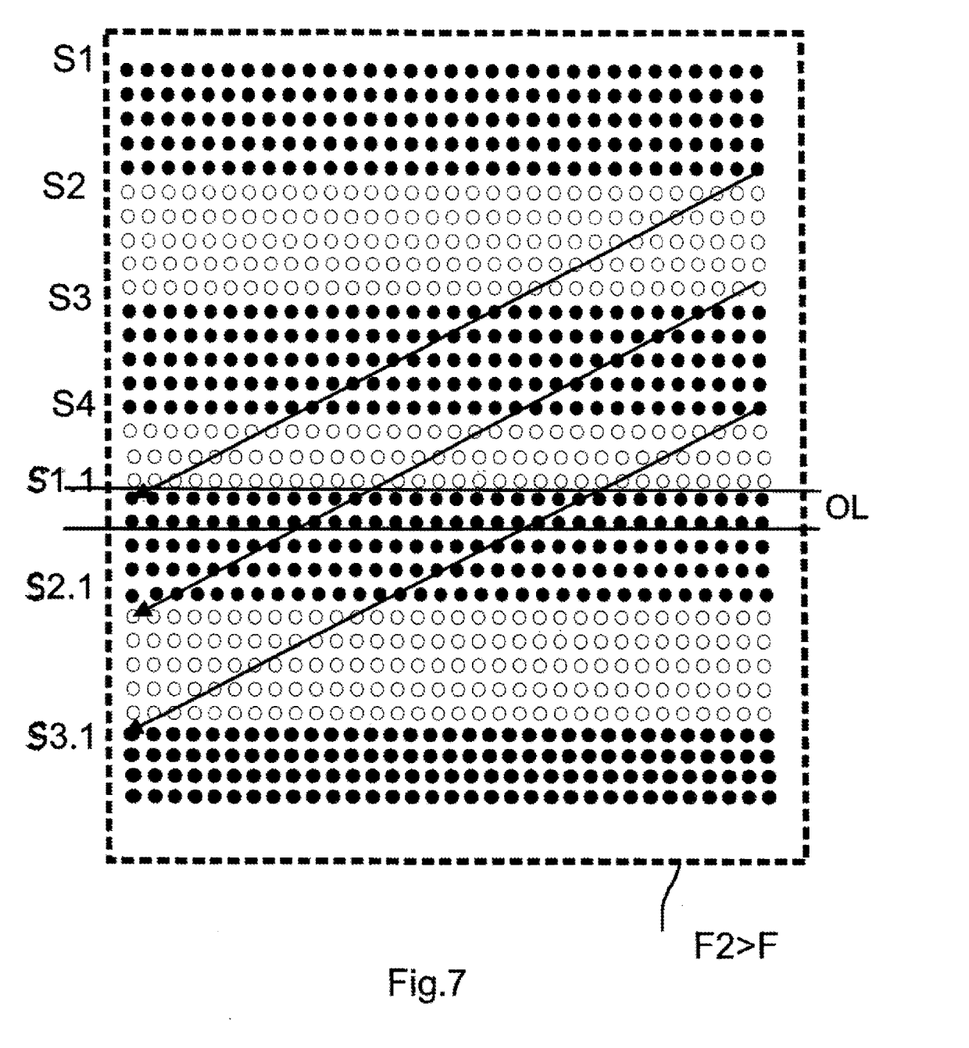
FIG. 7 illustrates an exemplary embodiment of a scanning field in accordance with one or more embodiments of the invention.

A further advantageous embodiment of the invention is illustrated in FIG. 7.

The representation is based on the FIG. 3 and the associated description (F2 greater than F). However, an overlap region OL of (for example) two lines delimited by >lines is provided here, this region being scanned both by the fourth spot (S4) and also then by the first spot (S1.1). Advantageously, but not necessarily, the overlap region consists of an integral number of lines.

In order to avoid an unnecessarily high stress on the sample in the region OL, the illumination intensity of the relevant points is reduced in the overlap region by suitable means such as for example a AOTF, advantageously for example to 50% in each case, in order to keep the overall stress on the sample constant.

As illustrated, in contrast to FIG. 3, the scan region S3.1 here consists of four lines, so that the total number of pixels scanned per image is advantageously constant, in this case 1034 pixels.

The purpose of the illustrated overlap region OL is to ensure a perfect image overlap of regions scanned by the individual spots (here S1-S4) to produce an overall image.

For this purpose in the overlap region OL, for example for the participating two spots, a structural analysis of the recorded features of the sample (such as contrast edges) is carried out and with the known means for image processing and correlation analysis a precise combination of the image parts recorded by the individual spots is carried out in order to produce a "seamless" overall image.

What is claimed is:

1. A method of scanning a scanning field of a multifocal laser scanning microscope having a slower scanner and a faster scanner, the scanning field having X columns and Y lines, wherein X and Y are integers greater than 0, comprising:

disposing N laser spots in the scanning field along a scanning direction of the slower scanner, wherein the laser spots have a spacing of D between each other and each laser spot has an associated raster area comprising K adjacent lines, wherein N is greater than 0 and K is greater than 1;

determining a spacing A of the K lines in each associated raster area such that A=D/K simultaneously scanning the laser spots across the associated raster areas;

moving the laser spots along or against the scanning direction of the slower laser by a skip distance, thereby associating a different raster area with each laser spot; and repeating above steps until at least Y lines have been scanned in total.

2. The method according to claim 1, wherein an enlargement of the scanning field takes place by selection of K, such that K<Y/N.

3. The method according to claim 1, further comprising performing a reduction in size of the scanning field by selecting a value of K, such that K>Y/N.

4. The method according to claim 1, further comprising performing switching off or modulating individual laser spots.

5. The method according to claim 1, further comprising switching off laser spots at different locations of the microscope.

6. The method according to claim 1, further comprising determining the value of D by optical zoom or an intervention in spot generation.

7. The method according to claim 1, wherein the number of laser spots is varied.

8. The method according to claim 1, wherein, there is no gap or overlap between adjacent raster areas such that a last line of a first raster area adjoins to a first line of an adjacent raster area.

9. The method according to claim 1, wherein at least two of the raster areas have an overlap region.

10. The method according to claim 9, further comprising scanning each line in the overlap region by a first laser spot and a second laser spot, wherein the first laser spot scans with half intensity and the second laser spot scans with half intensity.

11. The method according to claim 9, further comprising performing image analysis in the overlap region between information illuminated by different laser spots.

12. The method according to claim 10, further comprising performing image analysis in the overlap region by image between information illuminated by different laser spots.

13. The method according to claim 1, wherein the skip distance is (N−1)×K+1 lines along the scanning direction or (N+1)×K−1 lines against the scanning direction.

14. The method according to claim 4, further comprising performing the individual switching off or modulation of individual laser spots via at least one of acoustic-optic modulator (AOM), electro-optic modulator (EOM), acousto-optic deflector (AOD), or by scanner.

15. The method according to claim 5, further comprising performing the switching off of laser spots in a beam path where multiple laser spots are generated.

16. The method according to claim 9, wherein the overlap region corresponds to an integral number of lines.

* * * * *

UNITED STATES PATENT AND TRADEMARK OFFICE
CERTIFICATE OF CORRECTION

PATENT NO.       : 9,594,237 B2
APPLICATION NO.  : 14/348564
DATED            : March 14, 2017
INVENTOR(S)      : Daniel Schwedt, Tiemo Anhut and Tobias Kaufhold It is certified that error appears in the above-identified patent and that said Letters Patent is hereby corrected as shown below:

In the Claims

Column 6, Line 61, Claim 1, -A = D / K- should read --A = D / K;--

Signed and Sealed this
Sixteenth Day of May, 2017

Michelle K. Lee
*Director of the United States Patent and Trademark Office*